United States Patent [19]

Parks

[11] Patent Number: 5,535,377
[45] Date of Patent: Jul. 9, 1996

[54] METHOD AND APPARATUS FOR LOW LATENCY SYNCHRONIZATION OF SIGNALS HAVING DIFFERENT CLOCK SPEEDS

[75] Inventor: Terry Parks, Round Rock, Tex.

[73] Assignee: Dell USA, L.P., Austin, Tex.

[21] Appl. No.: 191,671

[22] Filed: Jan. 31, 1994

[51] Int. Cl.[6] .................................................. G06F 1/12
[52] U.S. Cl. .................... 395/550; 364/270; 364/271; 364/271.1; 364/DIG. 1
[58] Field of Search ...................... 395/550; 364/270, 364/270.6, 271, 271.1

[56] References Cited

U.S. PATENT DOCUMENTS

| | | | |
|---|---|---|---|
| 4,405,898 | 9/1983 | Flemming | 328/72 |
| 5,077,686 | 12/1991 | Rubinstein | 395/550 |
| 5,133,064 | 7/1992 | Hotta et al. | 395/550 |
| 5,256,994 | 10/1993 | Langendorf | 331/16 |
| 5,345,109 | 9/1994 | Mehta | 307/271 |

*Primary Examiner*—Kevin A. Kriess
*Assistant Examiner*—Dennis M. Butler
*Attorney, Agent, or Firm*—Henry N. Garrana; Mark P. Kahler; Michelle M. Turner

[57] ABSTRACT

A method and apparatus which synchronizes signals operating at different clock speeds with reduced synchronization latency. The present invention is preferably used in systems where a first logic portion operating at a first clock speed, referred to as a fast clock speed, interfaces to a second logic portion operating at a second, slower clock speed. A new slow clock is generated pseudo-synchronously from the fast clock using a phase locked loop (PLL) clock generator. The PLL multiplies the fast clock frequency up to the least common multiple (LCM) of the two frequencies to generate a base clock signal. The base clock is then divided down to form the slow clock signal. The PLL performs its operations in such a way that all three clocks have a fixed phase relationship. The rising edges of the base clock, fast clock, and slow clock line up at periodic points and are skewed at other periodic points. Fast to slow synchronization logic and slow to fast synchronization logic are included which synchronize signals travelling between the logic portions. In the general case for a first logic portion having a fast clock frequency m and a second logic portion having a slow clock frequency n, the base clock frequency would be the LCM (m,n). The multiplexor in the slow to fast signal synchronization logic used to synchronize slow signals, i.e., signals from the second logic portion, to the faster clock frequency would have $^{baseclock}/_m$ inputs. The multiplexor used to synchronize fast signals to the slower clock speed would have $^{baseclock}/_n$ inputs. Therefore, a method and apparatus for synchronizing signals travelling between logic portions based on different clock speeds is disclosed. This method has reduced latency as compared to prior art methods and thus provides increased performance over prior art designs.

15 Claims, 7 Drawing Sheets

Signal From Slow Clock Side to Fast Clock Side

Figure 4  Slow to Fast Signal Synchronization Logic

Signal From Slow Clock Side to Fast Clock Side

Figure 6  Fast to Slow Signal Synchronization Logic

Signal From Fast Clock Side to Slow Clock Side

METHOD AND APPARATUS FOR LOW LATENCY SYNCHRONIZATION OF SIGNALS HAVING DIFFERENT CLOCK SPEEDS

FIELD OF THE INVENTION

The present invention relates to synchronization in computer systems, and more particularly to a method and apparatus for synchronizing signals operating at different clock speeds with reduced latency.

DESCRIPTION OF THE RELATED ART

Computer systems continue to increase in both speed and complexity. One method that has been used to increase computer speed has been to increase the clock speed at which the microprocessor and various buses and logic elements operate. For example, where in the past processor clock speeds of 25 MHz were common, today processor clock speeds of 50 or 66 MHz or greater are now commonly used. In addition to a microprocessor, a computer system will typically have an expansion bus operating at a certain clock frequency, such as an ISA (industry standard architecture) bus, an EISA (extended industry standard architecture) bus, or an MCA (microchannel architecture) bus. The ISA and EISA buses operate at 8 MHz, whereas the MCA bus operates at 10 MHz or more. Due to limitations in the performance of the various expansion buses listed above, several new local bus standards have been developed to take advantage of the typically faster clock speeds. The two prevalent local bus standards are the PCI (peripheral components interface) bus and the VESA (Video Electronic Standards Association) bus, or VL bus. These buses can operate at various speeds, typically at either 33, 50 or 66 MHz.

Therefore, modern computer systems have various logic portions which operate synchronously at different clock speeds. Many times a first logic portion operating at a first clock speed is required to interface with a second logic portion operating at a second, different clock speed. For example, a CPU operating at 50 MHz may be required to interface with a PCI bus operating at 33 MHz. One problem that arises in this situation is that the various data and control signals on each side of the interface are synchronous to their respective clock signals, but these signals will not be synchronous with respect to the clock signal on the other side of the interface. Thus, if a logic circuit operating with a 50 MHz clock speed, i.e., at a higher clock speed, were to attempt to sample a signal which is operating based on a 33 MHz clock signal, i.e., at a slower clock speed, there is no way to ensure that the setup and hold times would be met. In this instance, the circuit could enter a metastable state, resulting in system failure.

Prior art computer systems have dealt with these limitations in either of two ways. A first method has been to operate the logic running at the slower clock speed at a frequency which is an integral division of the frequency of the higher clock speed logic. One disadvantage of this method is that the slow side of the interface will typically not run at its fastest speed. For instance, in the above example the CPU would still operate at 50 MHz, but the PCI bus would be required to run at 25 MHz instead of 33 MHz. Thus, the PCI bus would effectively lose 25% of its bandwidth.

A second method to overcome metastability problems caused by the interface of logic operating at different clock frequencies has been to transmit the interface signals through two stages of flip-flops. This has the effect of trapping any metastability between the two flip-flops and preventing the metastability from propagating into the system. However, one serious disadvantage of this method is that all signals across the interface are required to be delayed by two clock cycles, thus reducing system performance.

Therefore, an improved method and apparatus is desired which synchronizes signals operating at different clocks with reduced latency as compared to prior art methods.

SUMMARY OF THE INVENTION

The present invention comprises a method and apparatus which synchronizes signals operating at different clock speeds with reduced synchronization latency. The present invention is preferably used in systems where a first logic portion operating at a first clock speed, referred to as a fast clock speed, interfaces to a second logic portion operating at a second, different clock speed, referred to as a slow clock speed. According to the invention, a new slow clock is generated pseudo-synchronously from the fast clock using a phase locked loop (PLL) clock generator. The PLL multiplies the fast clock frequency up to the least common multiple (LCM) of the two fast and slow clock frequencies to generate a base clock signal. The base clock is then divided down to form a new version of the slow clock signal. This new version of the slow clock signal is provided as the clocking signal for the second logic portion. The PLL performs its operations in such a way that all three clocks have a fixed phase relationship. In the preferred embodiment the first logic portion operates at 50 MHz and the second logic portion operates at 33 MHz (really 33⅓ MHz), and the base clock has a frequency of 100 MHz.

The rising edges of the base clock, fast clock, and slow clock line up at periodic points and are skewed at other periodic points. In the preferred embodiment described above, the rising edge of the slow clock signal alternately either lines up with the rising edge of the fast clock signal or is skewed one base clock signal cycle from the rising edge of the fast clock signal. Similarly, the rising edge of the fast clock signal is periodically skewed from the rising edge of the slow clock signal by either 0, 1, or 2 base clock signal cycles. Logic according to the present invention utilizes this information to synchronize signals interfacing between the fast and slow logic portions with reduced latency.

For a signal travelling from the slow side to the fast side, the signal, which is intended to be sampled on the rising edge of the slow clock, is sampled by the first logic portion either simultaneously at the rising edge of the fast clock or alternatively is sampled at the next available fast clock rising edge, which is one base clock period (10 ns) after the time in which the signal was intended to be sampled. Each of these occurrences has a 50—50 chance due to the manner in which these signals are periodically skewed, and thus the synchronization latency is the average of these two occurrences, or 5 nanoseconds. In the second prior art method described above, the synchronization latency would be two fast clock signal cycles or 40 ns. Thus in this instance the present invention has reduced the synchronization latency by a factor of eight.

The synchronization that occurs for a signal travelling from the fast logic portion to the slow logic portion is similar. The signal is sampled at the slow side, i.e., by the second logic portion, with either a 0, 1, or 2 base clock signal cycle delay. In other words, due to the manner in which the rising edges of the base clock, fast clock, and slow clock periodically line up at various points and are periodically skewed at other points, a fast signal is alternately sampled by the slow logic portion with a delay of 0, 1, or 2 base clock signal cycles. The synchronization latency in this method is alternately 0 ns, 10 ns, and 20 ns, and thus the average latency using this method is 10 nanoseconds. This is in contrast to the second prior art method discussed above, where the average synchronization latency would be 60 nanoseconds. Thus, here the present invention reduces the synchronization latency by a factor of 6.

Slow to fast signal synchronization logic is included which synchronizes a signal travelling from the slow side to the fast side. In the preferred embodiment where the fast logic portion operates at 50 MHz and the slow logic portion operates at 33 MHz, the slow to fast signal synchronization logic includes a two input multiplexor that selects either the signal generated from the slow side or the signal generated from the slow side delayed by one base clock signal cycle. The select input of the multiplexor toggles between these two inputs depending upon which occurrence is taking place. The output of the multiplexor is the synchronized signal, which can then be immediately sampled by the logic portion operating at the fast clock frequency. Fast to slow signal synchronization logic is also included which synchronizes signals travelling from the fast side to the slow side. In the preferred embodiment this logic includes a three input multiplexor which receives three versions of the fast signal delayed by 0, 1, and 2 base clock signal cycles, respectively. The select input of the multiplexor receives an output from a counter which counts from 0 to 2, indicating the number of base clock delays to be used. The version of the fast signal used in turn depends on the periodic skew of the fast and slow clock signal rising edges.

The present invention can be applied generically to synchronizing signals having various clocking relationships. In the general case for a first logic portion having a fast clock frequency m and a second logic portion having a slow clock frequency n, the base clock frequency would be the LCM (m,n). The multiplexor in the slow to fast signal synchronization logic used to synchronize slow signals, i.e., signals from the second logic portion, to the faster clock frequency would have $^{base\ clock}/_m$ inputs. The multiplexor used to synchronize fast signals to the slower clock speed would have $^{base\ clock}/_n$ inputs. Therefore, a method and apparatus for synchronizing signals travelling between logic portions based on different clock speeds is disclosed. This method has reduced latency as compared to prior art methods and provides increased performance over prior art designs.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
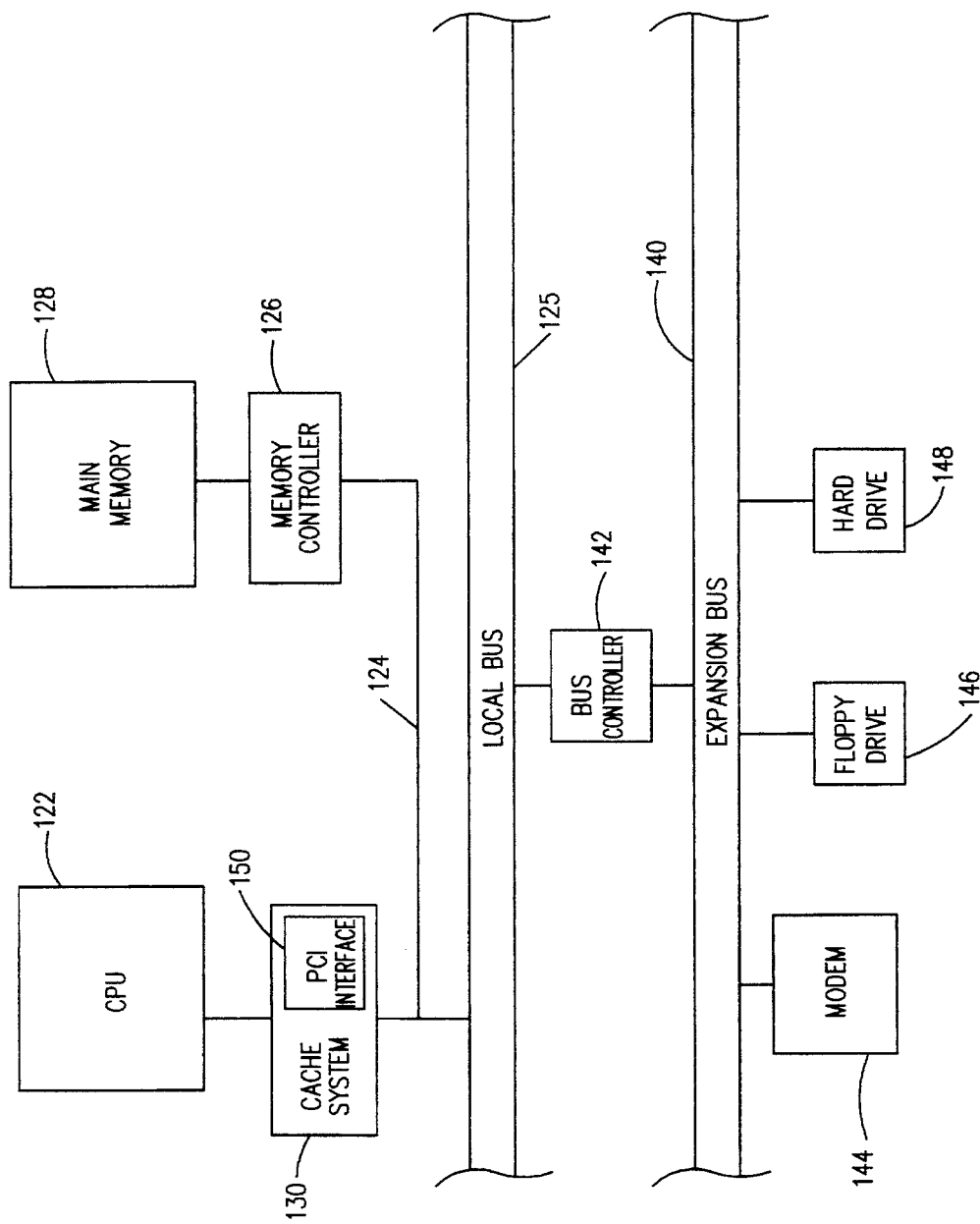
FIG. 1 is a block diagram illustrating a computer system according to one embodiment of the invention.

Referring now to FIG. 1, a computer system incorporating synchronization logic according to the preferred embodiment of the present invention is shown. It is noted that FIG. 1 illustrates the exemplary elements of a computer system, and the elements of a computer system not necessary to understand the operation of the present invention have been omitted for simplicity.

The computer system includes a central processing unit or CPU 122 which is coupled to a memory bus 124. The CPU 122 operates at 50 MHz in the preferred embodiment. However, it is noted that CPU 122 may operate at any of various frequencies. A CPU cache system 130 is preferably coupled between the CPU 122 and the memory bus 124. The cache system 130 preferably comprises cache memory and a cache controller. Main memory 128 is coupled to the memory bus 124 by means of memory controller 126. The cache system 130 couples to a local bus 125. The local bus 125 is preferably based on the PCI (peripheral connect interface) bus standard. However, other types of bus standards, such as that promulgated by the video electronics standards association (VESA), may also be used. The local bus 125 operates at 33 MHz in the preferred embodiment, although of course other clock speeds may be used. A video card or other type of I/O card (not shown) may be coupled to the local bus 125, as desired.

The local bus 125 is coupled to an expansion or input/output (I/O) bus 140 by means of a bus controller 142. The expansion bus 140 includes slots for various other devices, including modem 144, a floppy drive 146 and hard drive 148, as desired.

In the preferred embodiment, the cache system 130 includes PCI interface logic 150 which interfaces between the CPU 122 and the PCI local bus 125. The PCI interface logic 150 includes synchronization logic 200 (FIG. 2) according to the preferred embodiment of the present invention which synchronizes signals travelling between the CPU 122, which operates at 50 MHz in the preferred embodiment, and the local bus 125, which operates at 33 MHz in the preferred embodiment.

Figure 2:
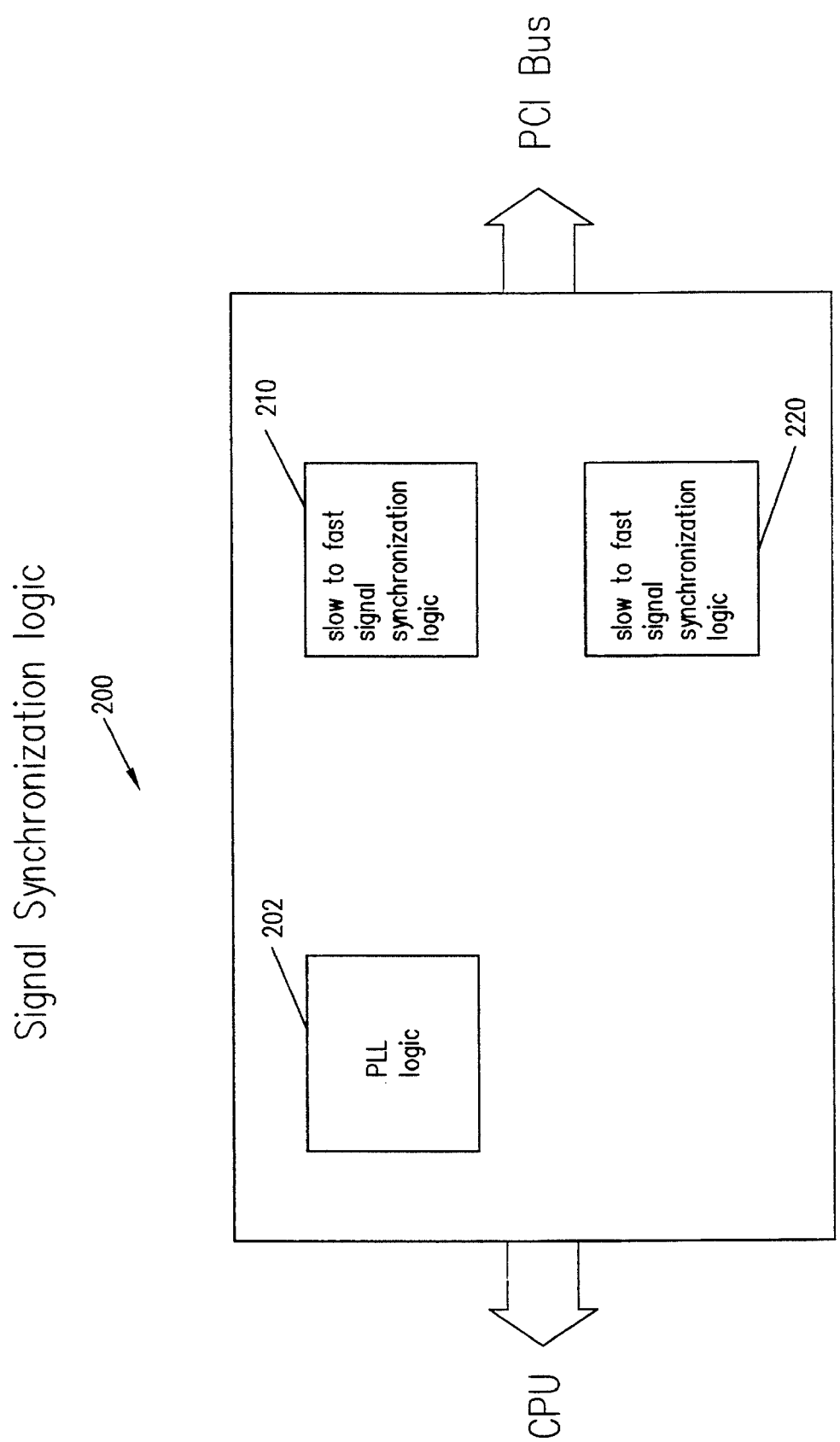
FIG. 2 is a block diagram illustrating synchronization logic of the present invention in the computer system of FIG. 1.

Referring now to FIG. 2, a block diagram illustrating the signal synchronization logic 200 of the present invention is shown. The signal synchronization logic 200 of the present invention synchronizes signals that interface between different logic portions having different clock speeds. This signal synchronization is performed with reduced latency as compared to prior art methods, thus increasing system performance. It is noted that the synchronization logic 200 of the present invention may be incorporated at any interface where signals having one clock speed must communicate to logic operating at a different clock speed. The present disclosure includes an example of the operation of the present invention where a microprocessor operating at 50 MHz interfaces to a PCI bus operating at 33 MHz, this also being the preferred embodiment of the invention. However, it is noted that the synchronization logic 200 of the present invention may be adapted to any of various types of interfaces where one logic portion operating at a first clock speed interfaces to a second logic portion operating at a different clock speed. It is further noted that the logic of the present invention operates regardless of the respective operating frequencies used by the first and second logic portions. A discussion of how the present invention can be generalized to function with logic operating at various clock speeds is included below.

Figure 3:
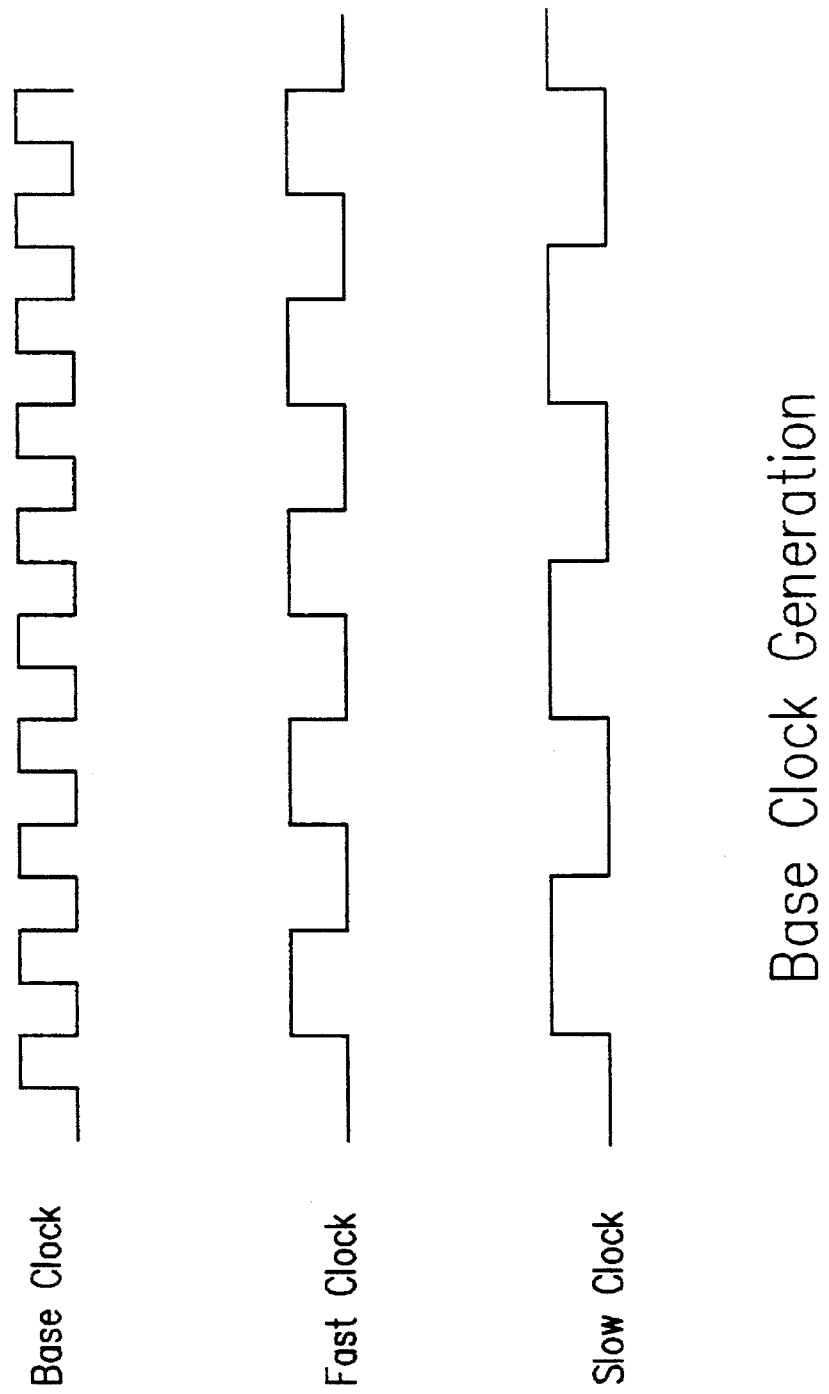
FIG. 3 is a timing diagram illustrating generation of the base clock signal according to the present invention.

As shown in FIG. 2, the signal synchronization logic 200 includes phase locked loop (PLL) clock generator logic 202. The PLL clock generator logic 202 multiplies the frequency of the faster clock signal up to the least common multiple of the two frequencies to generate a base clock signal. The base clock signal generated in the preferred embodiment is illustrated in FIG. 3. The base clock signal is then divided down to create a new version of the slow clock signal, which is also illustrated in FIG. 3. The PLL clock generator logic 202 performs these operations in such a way that all three clock signals have a fixed phase relationship, as shown in FIG. 3. Since the operation of phase locked loops is well known in the art, details of its operation are omitted for simplicity. This new version of the slow clock signal is used as the clocking signal in the slow logic portion, i.e., the PCI bus 125, as well as in synchronizing functions performed by the signal synchronization logic 200 according to the present invention, as discussed further below.

The signal synchronization logic 200 also includes slow to fast signal synchronization logic 210 which synchronizes signals from the slower logic portion, i.e., PCI bus signals based on a 33 MHz clock speed, so that they can be accurately sampled by the faster logic portion, i.e., the CPU 122, with reduced latency. The signal synchronization logic 200 further includes fast to slow signal synchronization logic 220 which synchronizes signals from the fast logic portion, CPU signals in the preferred embodiment, so that they can be accurately sampled by the slower logic portion, i.e., devices on the PCI bus 125, with reduced latency.

Figure 4:
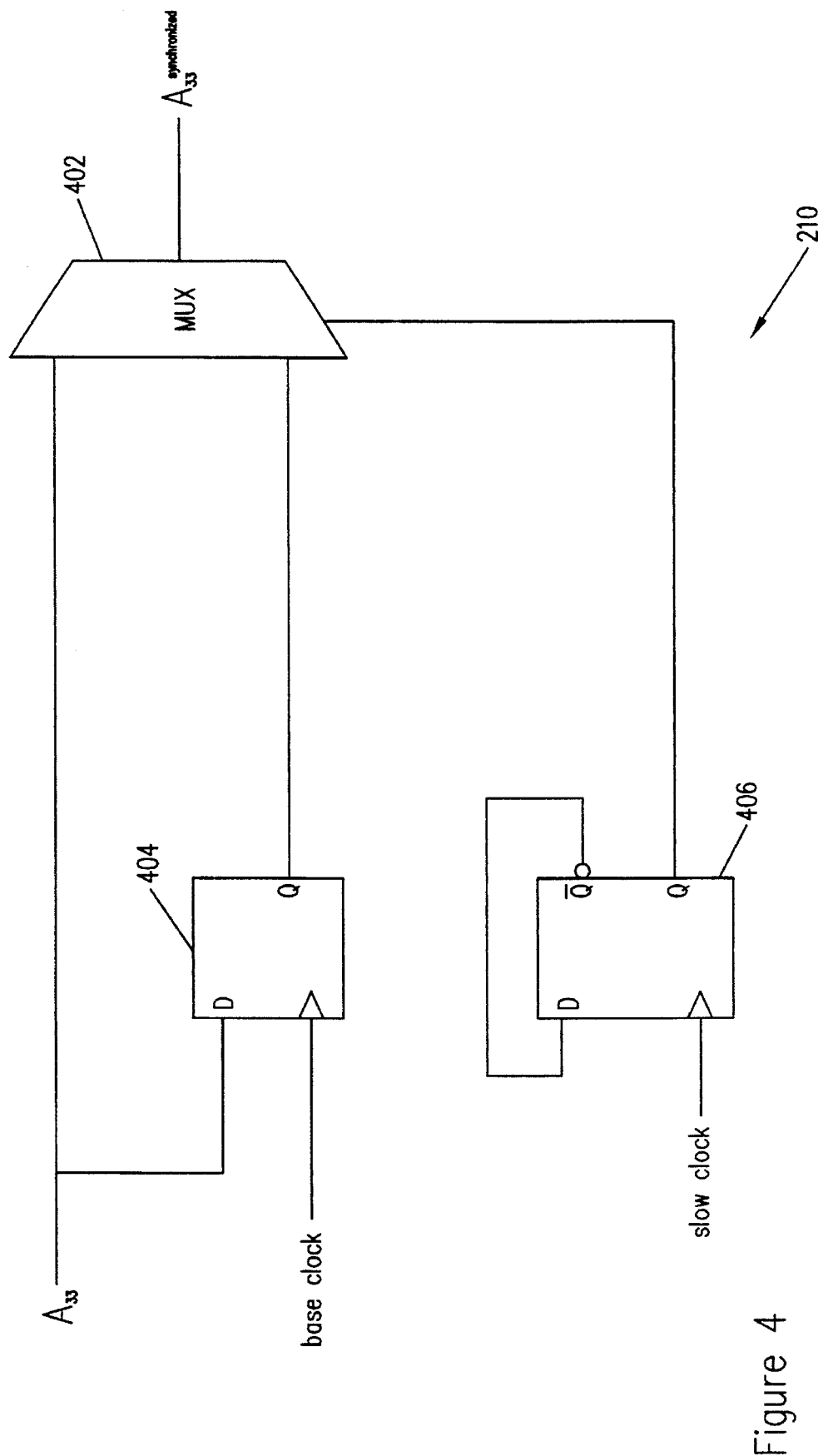
FIG. 4 illustrates slow to fast signal synchronization logic according to the preferred embodiment of the present invention.

Referring now to FIG. 4, a portion of the slow to fast signal synchronization logic 210 is shown. This portion of the slow to fast signal synchronization logic 210 synchronizes a PCI bus signal referred to as $A_{33}$, wherein the subscript 33 indicates that the signal is based on a clock speed of 33 MHz. The synchronization logic 210 includes similar logic for each PCI bus signal that interfaces with the CPU 122.

As shown in FIG. 4, the $A_{33}$ signal is connected to one input of a two input multiplexor 402. The $A_{33}$ signal is also connected to the D input of a D type flip-flop 404 whose Q output is connected to the other input of the multiplexor 402. The clock input of the flip-flop 404 receives the base clock signal. The slow clock signal generated by the PLL logic 202 is connected to the clock input of a falling edge triggered D type flip-flop 406. The inverted Q output of the flip-flop 406 is connected back into the D input of the flip-flop 406. The Q output of the flip-flop 406 connects to the select input of the multiplexor 402. The output of the multiplexor 402 is a synchronized version of the $A_{33}$ signal.

The multiplexor 402 selects either the $A_{33}$ signal output from the slow side, in this instance being the PCI bus, or the $A_{33}$ signal delayed by one base clock signal cycle. The select input of the multiplexor 402 receives a signal generated by the flip-flop 406. The flip-flop 406 essentially acts a simple state machine clocked by the falling edge of the slow clock signal which simply inverts or toggles its one bit output on every falling edge of the slow clock signal.

Figure 5:
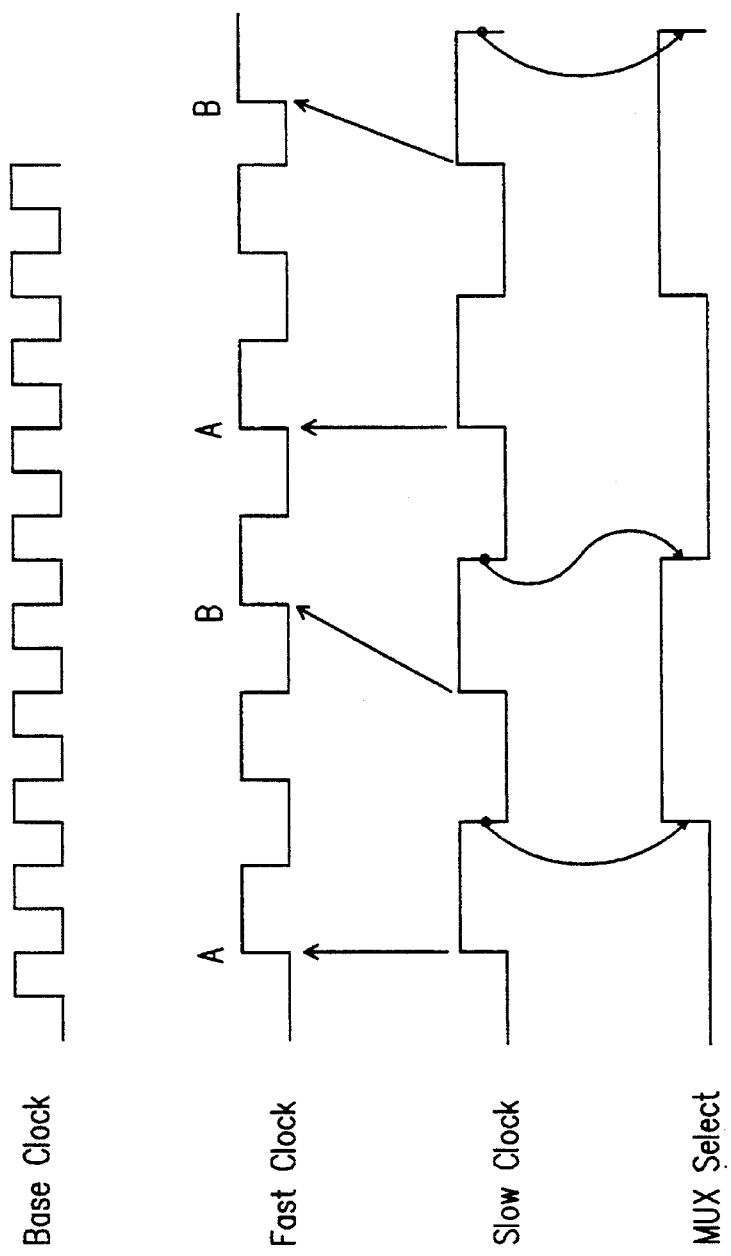
FIG. 5 is a timing diagram illustrating the relationship of the clocking signals in the slow to fast signal synchronization logic illustrated in FIG. 4.

Referring now to FIG. 5, a timing diagram illustrating operation of the slow to fast signal synchronization logic 210 is shown. This timing diagram illustrates the sampling that occurs when a signal, i.e., the $A_{33}$ signal, travels from the slow side to the fast side, i.e., when the $A_{33}$ signal travels from the PCI bus 125 operating at 33 MHz to the processor 122 operating at 50 MHz. As shown, the $A_{33}$ signal, which is intended to be sampled on the rising edge of the slow clock signal, is sampled by the fast clock signal at either of points A or B. The $A_{33}$ signal is either sampled by the fast clock signal at point A or is sampled by the base clock signal and held for one base clock period and then is sampled by the fast clock signal at point B. Due to the periodic nature of the respective clocks, and more particularly the manner in which the rising edges of the fast clock and the slow clock alternately line up with each other and then are offset with each other by one base clock period, each of these occurrences has a 50% chance. Thus the flip-flop 406 in FIG. 4 merely toggles back and forth alternately selecting the $A_{33}$ signal or the $A_{33}$ signal delayed by one base clock period.

FIG. 5 also illustrates the mux select signal output from the toggle flip-flop 406. As shown, the mux select signal is inverted on every falling edge of the slow clock signal. It is noted that additional circuitry may be necessary to achieve the correct initial value for the flip-flop 406 such that the output of the toggle flip-flop 406 is zero, and hence the undelayed version of the $A_{33}$ signal is selected, when all three rising clock edges are aligned. However, since the design of such circuitry to accomplish this is relatively simple and would be well known to one skilled in the art, details of this implementation are omitted for simplicity.

The latency for each of the two possible occurrences are 0 ns and 10 ns. Thus, the synchronization latency is the average of these two occurrences or 5 nanoseconds. With the second prior art method discussed above, the synchronization latency is two fast clock signal cycles, or 40 nanoseconds. Thus, the present invention reduces the synchronization latency by a factor of eight in this embodiment.

Figure 6:
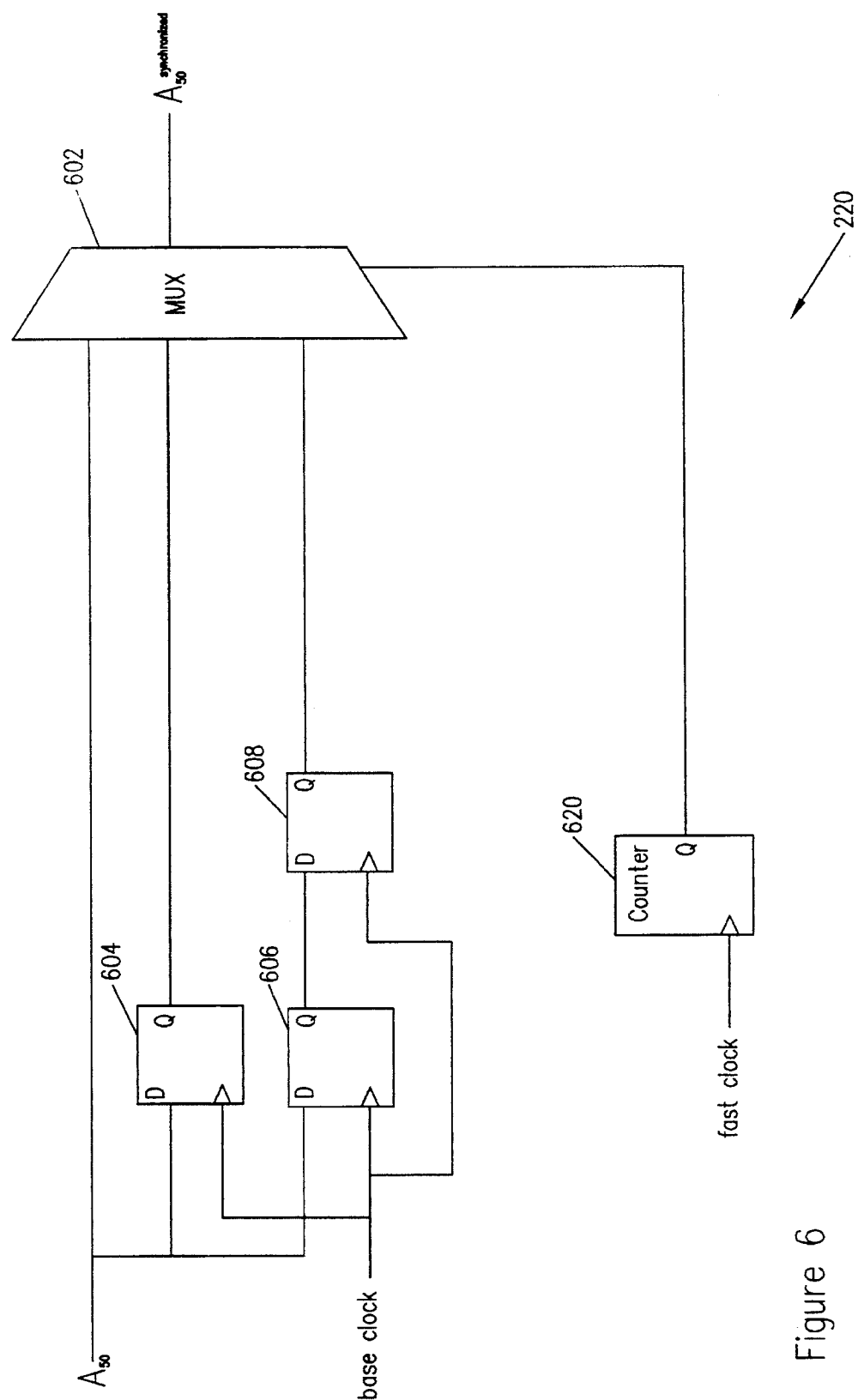
FIG. 6 illustrates fast to slow signal synchronization logic according to the preferred embodiment of the present invention.

Referring now to FIG. 6, a portion of the fast to slow signal synchronization logic 220 is shown. In FIG. 6, the signal from the fast logic portion which is desired to be sampled is referred to as $A_{50}$, wherein the subscript 50 indicates the signal is based on a clock frequency of 50 MHz in this example. The $A_{50}$ signal is connected to one input of a three input multiplexor 602. The $A_{50}$ signal is also connected to the D input of a D type flip-flop 604, whose Q output is connected to a second input of the multiplexor 602. The $A_{50}$ signal is also connected to the D input of a D type flip-flop 606 whose Q output is connected to the D input of a D type flip-flop 608. The Q output of the flip-flop 608 is connected to the third input of the multiplexor 602. The base clock signal is connected to the clock inputs of each of the flip-flops 604, 606, and 608. The fast clock signal is connected to the clock input of a counter 620 which continually counts from 0 to 2. The output of the counter 620 is provided to the select input of the multiplexor 602. The output of the multiplexor 602 is a synchronized version of the $A_{50}$ signal.

Figure 7:
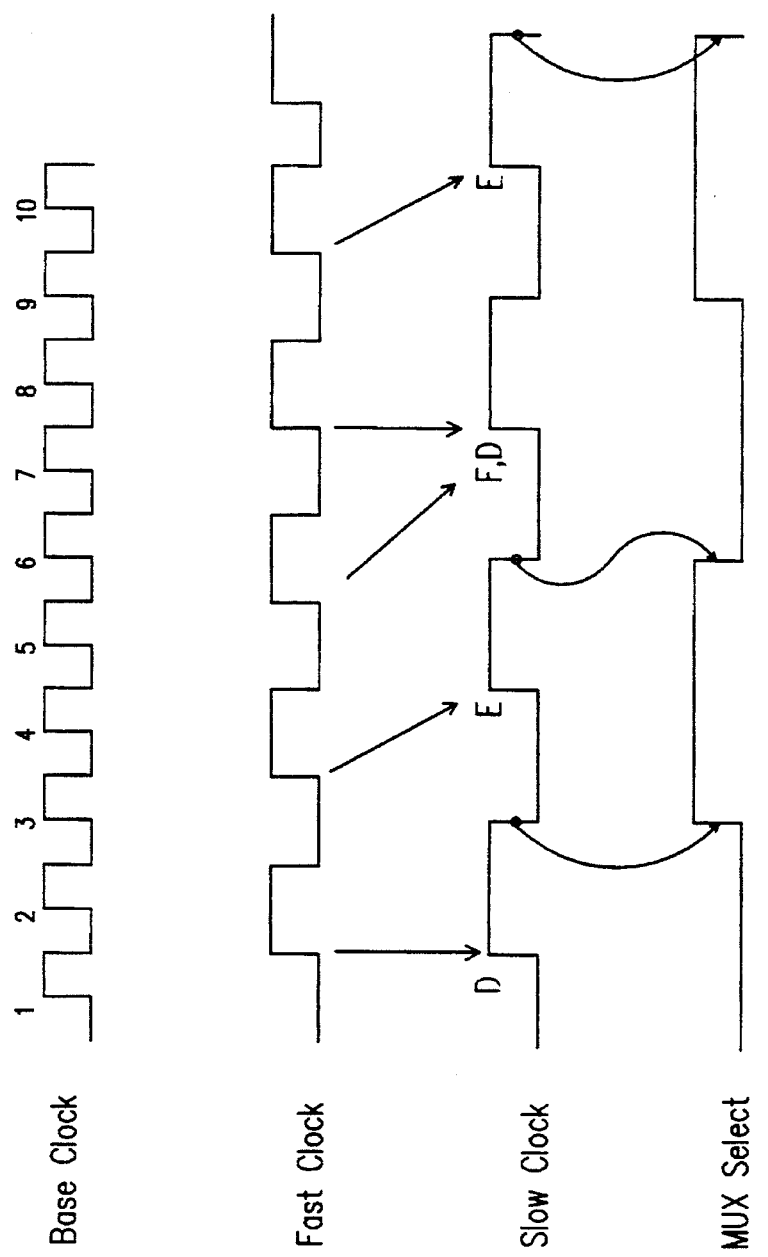
FIG. 7 is a timing diagram illustrating the relationship of the clocking signals in the fast to slow signal synchronization logic illustrated in FIG. 6.

Referring now to FIG. 7, a timing diagram illustrating the relationship of the fast and slow clock signals with respect to a signal travelling from the Fast clock side to the slow clock side is shown. As shown, a signal travelling from the fast clock side to the slow clock side will either be sampled by the slow clock at either of points D, E, or F. If the signal from the fast clock side was intended to be sampled on the first rising edge at time 1, then the signal will be sampled immediately on the rising edge of the slow clock signal at point D as shown. If the signal travelling from the fast clock side was intended to be sampled at the rising edge of the fast clock signal at time 3, then the synchronized signal $A_{50}$ output from the multiplexor 602 will be the signal output from the flip-flop 604, i.e., delayed one base clock signal cycle, and the signal will be sampled at point E, as shown. If the signal output from the fast clock side was intended to be sampled on the rising edge of the fast clock signal at time 5, then the synchronized signal output from the mux 602 will be the signal delayed by the two flip-flops 606 and 608, and the signal will actually be sampled on the rising edge of the slow clock signal at point F, as shown. Thus, for a signal travelling from the fast clock side to the slow clock side in the preferred embodiment, the signal will be sampled with either 0, 1 or 2 base clock signal cycle delays, these delays repeating continuously due to the periodic nature of the signals and the manner in which they are skewed relative to each other.

The latency for each of these three possible occurrences is 0, 10 ns, and 20 ns, respectively. Thus, the average synchronization latency is 10 ns. This is in contrast to an average latency of 60 ns for the second prior art method described above. Therefore, the present invention provides increased performance over prior art methods.

As discussed above, the present invention can be applied to synchronizing signals with various clocking relationships and comprised within various logic portions. The preferred embodiment described above wherein a processor operating at 50 MHz interfaces signals with a PCI bus operating at 33 MHz is merely one example of the operation of the present invention. In the general case for a first logic portion having a fast clock speed m and a second logic portion having a slow clock speed n, the base clock signal is computed as LCM (m,n). The base clock signal is then divided down to form the slow clock signal. The multiplexor used to synchronize slow signals to be sampled at the faster clock speed would have $^{base\ clock}/_m$ inputs. The multiplexor used to synchronize fast signals to be sampled at the slower clock speed would have $^{base\ clock}/_n$ inputs.

Therefore, a method and apparatus for synchronizing signals based on different clock speeds is disclosed which reduces latency as compared to prior art methods. The method and apparatus of the present invention thus provides increased performance over prior art designs.

Although the method and apparatus of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

I claim:

1. An apparatus for synchronizing signals based on different clock frequencies, comprising:

a first logic portion including a first clock signal having a first frequency, wherein said first logic portion operates at said first frequency;

a second logic portion coupled to said first logic portion, wherein said second logic portion receives a second clock signal having a second frequency, wherein said second logic portion operates at said second frequency, wherein said second frequency is different than said first frequency, and wherein said first logic portion generates signals which travel to said second logic portion and said second logic portion generates signals which travel to said first logic portion;

signal synchronization logic coupled between said first logic portion and said second logic portion, said synchronization logic comprising:

a clock generator for generating a base clock signal having a frequency which is a multiple of said first and said second frequencies, wherein said clock generator generates said second clock signal received by said second logic portion, wherein said second clock signal is generated from said base clock signal, and wherein said second clock signal has a substantially fixed phase relationship with said first clock signal;

first to second signal synchronization logic which receives a first signal generated by the first logic portion and generates a synchronized version of said first signal to the second logic portion, wherein said first to second signal synchronization logic uses said base clock signal to generate said synchronized version of said first signal, and wherein said synchronized version of said first signal is sampled by the second logic portion; and second to first signal synchronization logic which receives a second signal generated by the second logic portion and generates a synchronized version of said second signal to the first logic portion, wherein said second to first signal synchronization logic uses said base clock signal to generate said synchronized version of said second signal, and wherein said synchronized version of said second signal is sampled by the first logic portion.

2. The apparatus of claim 1, wherein said first signal is intended to be sampled at a first rising edge of said first clock signal, wherein said synchronized version of said first signal is sampled at a rising edge of said second clock signal concurrent with or immediately proximate to said first rising edge of said first clock signal.

3. The apparatus of claim 1, wherein said second signal is intended to be sampled at a first rising edge of said second clock signal, wherein said synchronized version of said second signal is sampled at a rising edge of said first clock signal concurrent with or immediately proximate to said first rising edge of said second clock signal.

4. The apparatus of claim 1, wherein said clock generator generates a base clock signal having a frequency which is the least common multiple of said first and said second frequencies.

5. The apparatus of claim 1, wherein said first to second signal synchronization logic selects said synchronized version of said first signal from a first number of signals comprising the first signal and one or more delayed versions of said first signal, said one or more delayed versions of said first signal being delayed by one or more base clock signal cycles; and wherein said second to first signal synchronization logic selects said synchronized version of said second signal from a second number of signals comprising the second signal and one or more delayed versions of said second signal, said one or more delayed versions of said second signal being delayed by one or more base clock signal cycles.

6. The apparatus of claim 5, wherein said first to second signal synchronization logic includes a multiplexor which selects between the first signal and one or more delayed versions of said first signal, and wherein said second to first signal synchronization logic includes a multiplexor which selects between the second signal and one or more delayed versions of said second signal.

7. The apparatus of claim 5, wherein said first number of signals consists of $^{base\ clock\ frequency}/_{slow\ clock\ frequency}$ signals and said second number of signals consists of $^{base\ clock\ frequency}/_{slow\ clock\ frequency}$ signals.

8. The apparatus of claim 7, wherein said first clock signal has a frequency of approximately 50 MHz, and said second clock signal has a frequency of approximately 33⅓ MHz, and wherein the second to first signal synchronization logic includes a multiplexor comprising two inputs receiving said second signal and a delayed version to said second signal, and the first to second signal synchronization logic includes a multiplexor comprising three inputs receiving said first signal and two delayed versions of said first signal.

9. An apparatus for synchronizing signals based on different clock frequencies comprising:

a first logic portion including a first clock signal having a first frequency, wherein said first logic portion operates at said first frequency;

a second logic portion coupled to said first logic portion, wherein said second logic portion receives a second clock signal having a second frequency, wherein said second logic portion operates at said second frequency, wherein said second frequency is different than said first frequency, and wherein said first logic portion generates signals which travel to said second logic portion;

a clock generator for generating a base clock signal having a frequency which is a common multiple of said first and said second frequencies, wherein said clock generator generates said second clock signal received by said second logic portion, wherein said second clock signal is generated using said base clock signal, and wherein said first clock signal and said second clock signal have a substantially fixed phase relationship; and signal synchronization logic coupled between said first logic portion and said second logic portion which receives a first signal generated by the first logic portion and generates a synchronized version of said first signal to the second logic portion, wherein said signal synchronization logic uses said base clock signal to generate said synchronized version of said first signal, and wherein said synchronized version of said first signal is sampled by the second logic portion.

10. The apparatus of claim 9, wherein said first signal is intended to be sampled at a first rising edge of said first clock signal, wherein said synchronized version of said first signal is sampled at a rising edge of said second clock signal concurrent with or immediately proximate to said first rising edge of said first clock signal.

11. The apparatus of claim 9, wherein said clock generator generates a base clock signal having a frequency which is the least common multiple of said first and second frequencies.

12. The apparatus of claim 9, wherein said signal synchronization logic selects said synchronized version of said first signal from a first number of signals comprising the first signal and one or more delayed versions of said first signal, said one or more delayed versions of said first signal being delayed by one or more base clock signal cycles.

13. The apparatus of claim 9, wherein said signal synchronization logic includes a multiplexor which selects between the first signal and one or more delayed versions of said first signal.

14. The apparatus of claim 9, wherein said first number of signals consists of $^{base\ clock\ frequency}/_{slow\ clock\ frequency}$ signals.

15. The apparatus of claim 9, wherein said signal synchronization logic receives a second signal generated by the second logic portion and generates a synchronized version of said second signal to the first logic portion, wherein said signal synchronization logic uses said base clock signal to generate said synchronized version of said second signal, wherein said synchronized version of said second signal is sampled by the first logic portion.

* * * * *